United States Patent
Lee et al.

(10) Patent No.: US 9,329,746 B2
(45) Date of Patent: May 3, 2016

(54) METHOD FOR MANAGING CONTENTS AND DISPLAY APPARATUS THEREOF

(75) Inventors: Hyungnam Lee, Pyeongtaek-si (KR);
Saehun Jang, Pyeongtaek-si (KR);
Jaekyun Kim, Pyeongtaek-si (KR);
Sangjun Koo, Pyeongtaek-si (KR);
Sangseok Lee, Pyeongtaek-si (KR);
Kyunghee Yoo, Pyeongtaek-si (KR);
Uniyoung Kim, Pyeongtaek-si (KR)

(73) Assignee: LG ELECTRONICS INC., Seoul (KR)

( * ) Notice: Subject to any disclaimer, the term of this patent is extended or adjusted under 35 U.S.C. 154(b) by 545 days.

(21) Appl. No.: 12/907,305

(22) Filed: Oct. 19, 2010

(65) Prior Publication Data
US 2011/0131296 A1 Jun. 2, 2011

(30) Foreign Application Priority Data

Nov. 27, 2009 (KR) .................. 10-2009-0115958
Nov. 27, 2009 (KR) .................. 10-2009-0116161
Dec. 22, 2009 (KR) .................. 10-2009-0129086

(51) Int. Cl.
*G06F 3/16* (2006.01)
*G06F 3/0481* (2013.01)
*G06F 3/01* (2006.01)
*G06F 3/0346* (2013.01)
*H04N 21/2743* (2011.01)
*H04N 21/475* (2011.01)
*H04N 21/488* (2011.01)

(52) U.S. Cl.
CPC .............. *G06F 3/0481* (2013.01); *G06F 3/017* (2013.01); *G06F 3/0346* (2013.01); *H04N 21/2743* (2013.01); *H04N 21/4753* (2013.01); *H04N 21/488* (2013.01)

(58) Field of Classification Search
CPC ........................... G06F 17/30056; G06F 21/36
USPC .............. 725/41, 44, 37, 38, 56, 52; 715/719, 715/722, 723; 709/203, 204, 219, 226
See application file for complete search history.

(56) References Cited

U.S. PATENT DOCUMENTS 7,797,713 B2 *  9/2010  Dawson et al. ................. 725/52
7,933,338 B1 *  4/2011  Choudhry et al. ....... 375/240.26

(Continued)

FOREIGN PATENT DOCUMENTS

KR    10-2005-0004847 A    1/2005
KR    10-2008-0080961 A    9/2008

(Continued)

OTHER PUBLICATIONS

Korean Office Action issued in Application No. 10-2009-0115958 dated Aug. 24, 2015.

(Continued)

*Primary Examiner* — Aftab N. Khan
(74) *Attorney, Agent, or Firm* — Ked & Associates, LLP

(57) ABSTRACT

Embodiments relates to a method for managing contents and a display apparatus using the method, and the method include: displaying at least one icon representing contents provider and icons representing user contents service; receiving a selection of a first icon corresponding to a first contents provider in the displayed icons; and storing information on user's contents in contents provided from the first contents provider to correspond to the user contents service.

9 Claims, 13 Drawing Sheets

(56) References Cited

U.S. PATENT DOCUMENTS

| | | | |
|---|---|---|---|
| 8,078,632 B1* | 12/2011 | Stoutamire et al. | 707/759 |
| 2005/0257166 A1* | 11/2005 | Tu | 715/787 |
| 2007/0239566 A1* | 10/2007 | Dunnahoo et al. | 705/27 |
| 2009/0172551 A1* | 7/2009 | Kane et al. | 715/733 |
| 2009/0271706 A1* | 10/2009 | Volk | 715/733 |
| 2010/0115554 A1* | 5/2010 | Drouet et al. | 725/41 |
| 2010/0162172 A1* | 6/2010 | Aroner | 715/838 |
| 2010/0192175 A1 | 7/2010 | Bachet et al. | |
| 2010/0325568 A1* | 12/2010 | Pedersen et al. | 715/765 |
| 2011/0078718 A1* | 3/2011 | Jakobi et al. | 725/14 |
| 2011/0119712 A1* | 5/2011 | Choi et al. | 725/46 |
| 2012/0166950 A1* | 6/2012 | Frumar et al. | 715/719 |

FOREIGN PATENT DOCUMENTS

| | | |
|---|---|---|
| KR | 10-2009-0041014 A | 4/2009 |
| KR | 10-2009-0120547 A | 11/2009 |
| KR | 10-2009-0120712 A | 11/2009 |

OTHER PUBLICATIONS

Korean Office Action issued in Application No. 10-2009-0129086 dated Sep. 25, 2015.

"How to Use Your Mega Tv"; Daum (Korean Web Portal Blog); Feb. 14, 2009; pp. 1-7. (English Translation attached).

Korean Office Action dated Dec. 11, 2015 issued in Application No. 10-2009-0116161.

* cited by examiner

METHOD FOR MANAGING CONTENTS AND DISPLAY APPARATUS THEREOF

CROSS-REFERENCE TO RELATED PATENT APPLICATIONS

This application claims the benefit of Korean Patent Application Nos. 10-2009-0115958, filed in Korea on Nov. 27, 2009, 10-2009-0116161, filed in Korea on Nov. 27, 2009, and 10-2009-0129086, filed in Korea on Dec. 22, 2009.

BACKGROUND OF THE INVENTION

1. Field of the Invention

Embodiments relate to a method for managing various contents and a display apparatus using the same.

2. Description of the Conventional Art

As the digital TV technology based on the digital technology has been developed and commercialized, from the existing analog broadcasting, it has become possible to provide users with a variety of contents services, such as real-time broadcasting, COD (Contents on Demand), games, and news, using the internet network provided in each home, other than the existing radio media.

An IPTV (Internet Protocol TV) can be an example of the contents services provided through the internet network. The IPTV is to transmit and provide various information services, video contents, and broadcasting to televisions of users, using the high-speed internet network.

Recently, a broadband TV and a web TV etc. has been proposed, as a type of network TV that further progresses than the IPTV. Unlike the existing IPTV, in the broadband TV or web TV, there are several contents providers, and users can be provided with contents that the contents providers provide, such as various VODs, games, video telephone services, by individually connecting to the several contents providers.

SUMMARY OF THE INVENTION

Embodiments provide a method for managing contents which makes it possible to effectively manage user contents, and a display apparatus using the method.

An embodiment provides a method for managing contents in a display apparatus connectable to a network, which includes: displaying at least one icon representing contents provider and icons representing user contents service; receiving a selection of a first icon corresponding to a first contents provider in the displayed icons; and storing information on user's contents in contents provided from the first contents provider to correspond to the user contents service.

Another embodiment provides a display apparatus including: a network interface unit that is connected with a server of a contents provider to receive contents; a display unit that displays at least one icon representing the contents provider and an icon representing user contents service; a user interface unit that receives a selection of an icon representing the user contents service from the displayed icons; a storage unit that stores contents information corresponding to the user contents service; and a control unit that performs control to receive the user's contents in contents stored in a first contents provider, by using the stored contents information, in which the user's contents are contents uploaded or downloaded to/from the server by the user.

Meanwhile, the method for managing contents can be implemented by a computer-readable media where a program executed by a computer is recorded.

DETAILED DESCRIPTION OF THE PREFERRED EMBODIMENT

Hereafter, a method for managing contents and a display apparatus using the method according to an embodiment of the present invention are described in detail with reference to the accompanying drawings.

Figure 1:
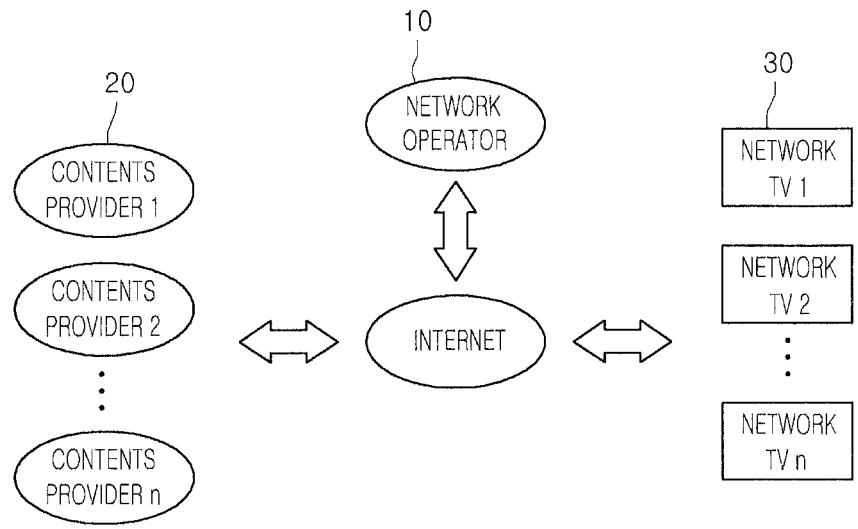
FIG. 1 is a diagram illustrating the network configuration of a display system according to an embodiment of the present invention.

FIG. 1 is a diagram illustrating the configuration of a display system according to an embodiment of the present invention, that is, the configuration of a network TV system receiving contents from contents providers, using a network.

Referring to FIG. 1, a display system according to an embodiment of the present invention may be composed of a network operator 10, at leas one contents provider (CP) 20, and at least on network TV 30, which can be connected with each other by a network, for example, Internet.

The network operator 10 can provide the network TV 30 with basic software required for contents provided from the contents provider 20 to normally operate in the network TV 30, or software for the network TV to operate. Further, it is possible to also provide the contents provider 20 with hardware information of the network TV 30 which is required for the contents to normally operate in the network TV 30.

For example, the network operator 10 provides a main image frame required to provide the network TV 30 with the contents provided from the contents providers, and may provide a user interface for users to select the contents, or input various instructions, or display corresponding outputs. Further, the network operator 10 may also provide data for updating firmware or software of the network TV 30, and may be the same as the manufacturer of the network TV 30.

The contents provider 20 produces a variety of contents that can be provided on the network and makes them in a format that the network TV 30 can play, and can provide the contents in accordance with request of the network TV 30. The contents according to the present invention may be any multimedia contents that can be serviced through the network.

For example, the contents provided from the contents provider 20 may be provided to the network TV 30 through internet directly from the contents provider 20, or may be provided to the network TV 30 through the network operator 10.

The network TV 30 may be provided with an exclusive firmware for playing and searching the contents from the contents provider 20, and displaying lists. The firmware may be installed in the network TV in manufacturing the network TV 30, or users may download and install the firmware from the contents provider 20 or the network provider 10, while using the firmware.

The firmware of the network TV 30 may be a program for playing or executing the contents provided from the contents provider 20. The firmware depends on the types of contents provided from the contents provider 20. For example, the firmware may be a VOD play program, when the contents provider 20 is a VOD operator. The firmware may be an AOD or MOD play program, when the contents provider 20 is an AOD or MOD operator. When the contents provider 20 is a video communication operator, the firmware may be a video communication program.

The network TV 30 can receive, and play or execute the contents from the contents provider 20. The network TV 30 may include a TV equipped with a network module, a broadcast receiver, such as a set top box, and any display apparatus equipped with a network module, such as a network telephone. Although a broadcast receiver having a function of receiving broadcast is exemplified herein, embodiments of the present invention can be applied to any display apparatuses that can connect to a network and all of which may be included in the scope of the present invention.

In more detail, the contents provider 20 may be an operator that produces or distributes various contents to provide to the network TV 30. The contents provider 20 may include a TV station, a radio station, a VOD operator, an AOD operator, a game operator, a video communication service provider, a weather information provider, a photo-related service provider etc.

The TV station implies the existing terrestrial or cable broadcasting station and the broadcasting station can produce and store programs that the TV audience can watch, and can convert and transmit the programs in a digital format.

The radio station provides audio contents, and may provide the audio contents with video contents or only the audio contents without video contents.

The VOD operation or the AOD operator has features different from the TV station or the radio station. That is, the VOD or the AOD operator allows users to save desired TV programs, movies, or music, and then play them. For example, when a user had no time to watch a desired program and couldn't watch it, the user can download or directly play the corresponding file to watch it by connecting to a site that provides this broadcasting service.

The AOD operator can provide audio contents streaming service.

The MOD (Music On Demand) service provider allows user to download and listen to desired music.

The video communication service provider can provide a relay service to allow for a video call with a user who uses another network TV, through the network. The weather information provider provides local weather information and the photo-related service provider can provide tools for editing and saving photographs.

In addition, the contents provider 20 may be any server operator who can provide various services to the network TV through the internet, such as a PF (Packet Filter) server, an EPG service provider, an ECG (Electronic Content Guide) service provider, and a portal server operator etc.

The PF server is serviced by a company that manages as a substitute all broadcasting information and location information provided by the contents provider. This service may contain broadcasting time of a corresponding broadcasting station, location information needed for broadcasting, and information that a user can contact.

The EPG service can provide EPG information for users to search broadcasting programs for each time period and each channel.

The ECG service can provide users with information on contents of the contents provider, the location of the connected server, and access authority, and for example, may be an electronic program guide that allows for easy connection with servers having contents and providing detail information on the contents.

The portal server is a type of web services provided by each broadcasting station, and can connect to the web server of broadcasting stations or companies providing contents service, when receiving a request from users' terminals. The function of the portal server is to make it possible to search program lists provided by the broadcasting stations and contents providers providing contents service.

The network TV 30 basically has a network interface to be able to be connected to a network and is provided with an IP address to process a data packet through the network, and may store or play the data packet when the data packet is multimedia data, such as a video or audio.

The network TV 30 can operate to bi-directionally transmit the users' requests while processing multimedia data. Further, it is preferable that the user input unit for controlling the network TV 30, such as a remote controller or operation buttons, is provided with buttons for controlling the network TV, that is, buttons for selecting various menus.

The configuration and operation of the network TV 30 described above are described hereafter in detail.

Figure 2:
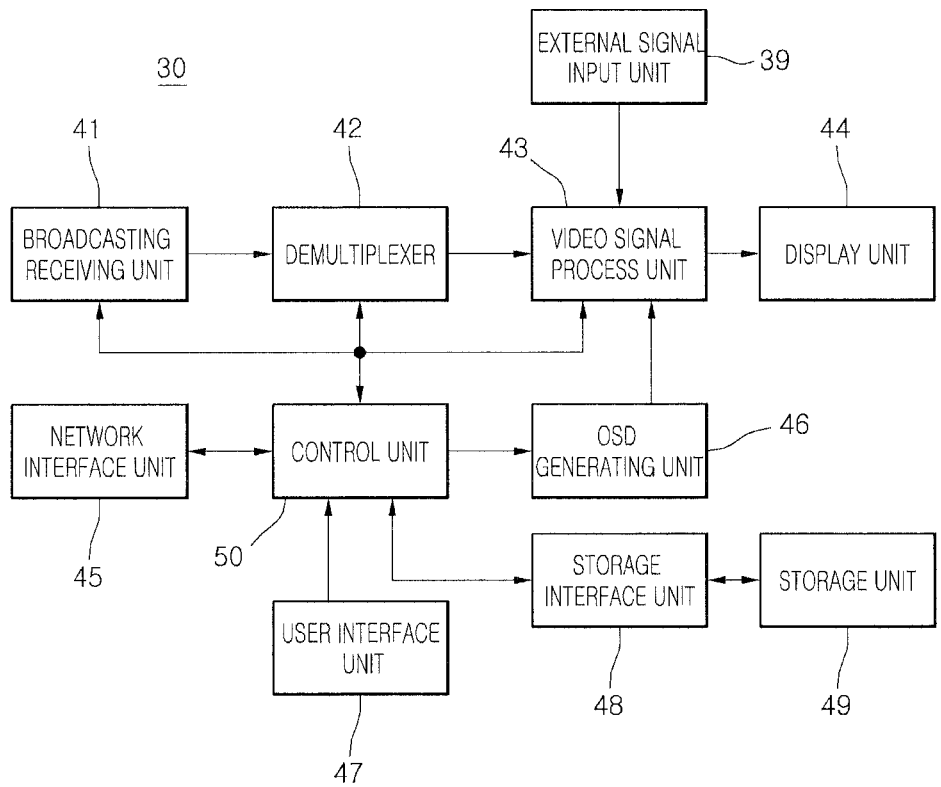
FIG. 2 is a block diagram showing a first embodiment of the configuration of a display apparatus according to the present invention.

FIG. 2 is a block diagram showing a first embodiment of the configuration of a display apparatus according to the present invention, that is, showing the configuration of the network TV 30 shown in FIG. 1.

Other than the function of receiving contents through a network, the network TV 30 may be provided with a function of receiving RF signal type broadcast signals by wireless communication or through a cable, using the broadcast receiving unit 41.

As shown in FIG. 2, the network TV 30 may include a broadcast receiving unit 41, a demultiplexing unit 42, a video signal process unit 43, a display unit 44, a network interface unit 45, an OSD generating unit 46, a user interface unit 47, a storage interface unit 48, a storage unit 49, an external signal input unit 39, and a control unit 50.

In the components described above, the broadcast receiving unit 41, demultiplexing unit 42, and video signal process unit 43 can constitute one broadcast process unit that receives broadcast signals and processes them into a type which can be outputted to the display unit 44, by performing various processes.

In digital broadcasting, digital broadcast signals may be transmitted in transport stream type packeted by time-division multiplexing video signal, audio signals, and addition data.

The broadcast receiving unit 41 includes an antenna receiving broadcast signals transmitted from the outside, and may include a tuner that tunes a broadcast signal having a corresponding frequency band in accordance with a tuning control signal of the control unit 50, which is described below, and a demodulator that outputs the broadcast signal of a predetermined tuned channel by performing a VSB (Vestigial Sideband) modulating process and an error correcting process to the broadcast signal.

Further, the broadcast signal received by the broadcast receiver 41 is divided into various additional data defined as a video signal, an audio signal, and a PSIP (Program and System Information Protocol) information etc. by the demultiplexer 42, and then outputted in a bit stream type.

The video data separated by the demultiplexer 42 may be processed by the video signal processor 43 and displayed by the display 44.

Meanwhile, the video signal processor 43 includes an MPEG-2 decoder and a scaler that converts the video data to meet vertical frequency, resolution, picture ratio, etc., corresponding to output standards of the display 44.

The display unit 44 can display videos, using various types of display panels, such as a DLP (Digital Light Processing), an LCD (Liquid Crystal Display), and PDP (Plasma Display Panel).

The audio signal is processed by a voice signal process unit (not shown) and outputted from a speaker, in which the voice signal process unit may include an AC-3 decoder.

On the other hand, the additional data included in the additional data separated by the demultiplexing unit 42 may be stored in the storage unit 49 through the storage interface unit 48, which is described below.

The storage unit 49 may be implemented by EEPROM (electrically erasable programmable read-only memory) etc.

The user interface unit 47 is a means for receiving a request instruction from a user and generally includes an infrared receiving unit that receives an infrared signal inputted by a remote controller or a local key input unit disposed at one side of a panel.

The network interface unit 45 can receive contents or data from the contents provider 20 or the network operator 10 through the network. That is, it can receive contents, such as broadcast, games, VODs, broadcast signals, provided from the contents provider and the associated information. Further, it can also receive the updated information of a firmware and updated which the network operator 10 provides through the network interface 45.

The OSD generator 46 can generate a menu picture for receiving the user's determination signal in an OSD (On Screen Display) type.

That is, the OSD generating unit 46 can display the contents received through the network interface unit 45 and the associated information through the display unit.

The external signal input unit 39 is an interface that can receive inputs from other players, such as a DVD player and a game machine, and it is possible to connect other players to the external signal input unit 39 and output multimedia stored in the players to the display unit 44.

The control unit 50 can control the overall operations in accordance with the instructions inputted from the user interface unit 47. The control unit 50 can receive and execute software of the contents provider 20 received from the network operator 10, i.e. the updated file of the firmware.

Depending on embodiment, the broadcast receiving apparatus 30 according to the present invention may output a 3D-image. The menu screen of the broadcast receiving apparatus 30 can be provided in 3D and can also receive and output 3D-contents, when the contents provided by the contents provider 20 are 3D-contents. Meanwhile, additional components may be required to output a 3D-image.

Figure 3:
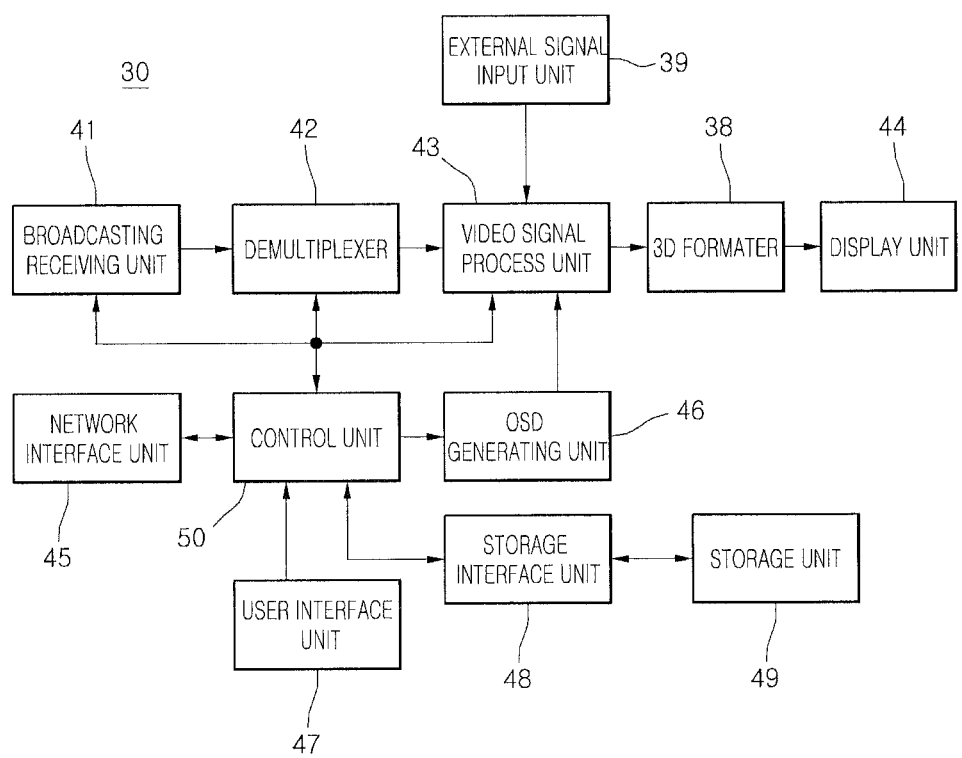
FIG. 3 is a block diagram showing a second embodiment of the configuration of a display apparatus according to the present invention.

FIG. 3 is a block diagram showing a first embodiment of the configuration of a display apparatus according to the present invention, that is, showing the configuration of the network TV 30 that can process the 3D-image. Meanwhile, the same ones as those described with reference to FIGS. 1 to 2 in the configuration of the network TV 30 shown in FIG. 3 will not be described hereafter.

As shown in FIG. 3, the 3D-formatter 38 can be disposed at the output end of the video signal process unit 48. The 3D-formatter 38 can convert the image processed by the video signal process unit 48 into a 3D-image and transmit it to the display unit 44. Depending on embodiment, a specific 3D-formatter that converts an OSD output into 3D may be included in the OSD generating unit 46.

The configuration shown in FIG. 3 is nothing but an example, and various known technologies can be used to process a 3D-image.

Figure 4:
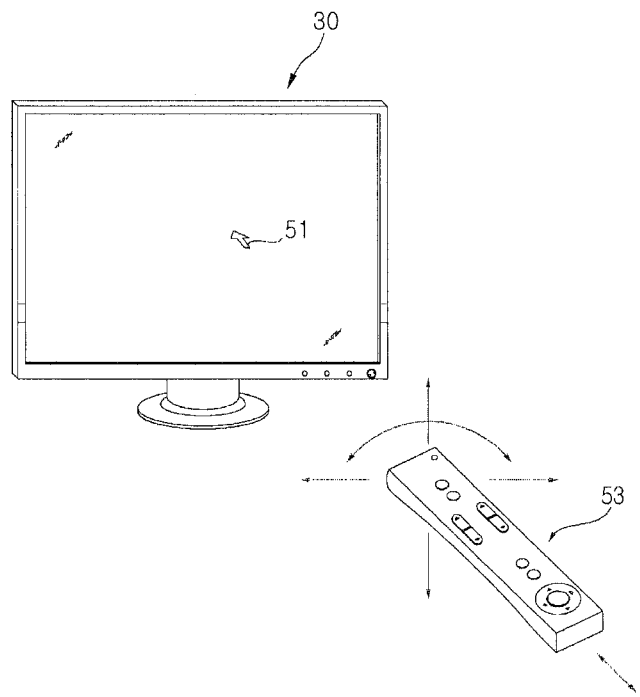
FIGS. 4 and 5 are diagrams showing an embodiment of a remote controller for controlling the operation of a display apparatus.
Figure 5:
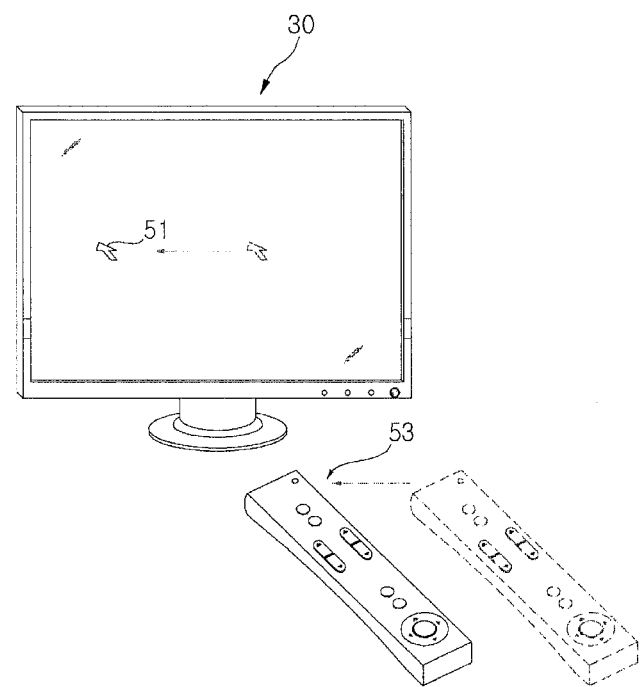

FIGS. 4 and 5 show an embodiment of a remote controller for controlling the operation of the display apparatus, that is, an example of a remote controller for controlling the network TV 30.

The remote controller can transmit a control signal to the control unit 50 through a wireless signal receiver that receives wireless signals, such as an RF signal and an infrared signal and can be included in the user interface unit 47 of the network TV 30. For example, the remote controller described with reference to FIGS. 4 to 6 may be a remote controller that responses to not only a button input by a user, but a user's gesture, and which is referred to as a motion recognition remote controller 51 hereafter.

In the present embodiment, the motion recognition remote controller 51 can transmit/receive a signal to/from the network TV 30 in accordance with an RF communication regulation. As shown in FIG. 4, a pointer 53 can be displayed at a position pointed by the motion recognition remote controller 51 on the network TV 30.

A user can move or rotate the motion recognition remote controller 51 up/down, left/right, and forward/backward. The pointer 53 displayed on the network TV 30 responds to the movement of the motion recognition remote controller 51. FIG. 5 shows when a pointer displayed on the network TV 30 moves in response to the movement of the motion recognition remote controller 51.

As shown in FIG. 4, when a user moves the motion recognition remote controller 51 to the left, the pointer displayed on the network TV 30 correspondingly moves to the left. The motion recognition remote controller 51 may have a sensor that can recognize movement in this embodiment. Information on the movement of the motion recognition remote controller 51 which has been detected by the sensor of the motion recognition remote controller 51 is transmitted to the network TV 30. The network TV 30 determines the movement of the motion recognition remote controller 51 on the basis of the information on the movement of the motion recognition remote controller 51 and calculates corresponding coordinates of the pointer 53.

An acceleration sensor, a gyrosensor, or a geomagnetic sensor can be used for the sensor that can recognize movement.

FIGS. 4 and 5 show an example when the pointer 53 displayed on the display 49 moves in response to up/down and left/right movement or rotation of the motion recognition remote controller 51. The movement velocity or direction of the pointer 53 may respond to the movement velocity or direction of the motion recognition remote controller 51.

In this embodiment, a pointer displayed on the network TV 30 is set to move in response to motion of the motion recognition remote controller 51. According to another example, a predetermined instruction may be inputted to the network TV 30 in response to motion of the motion recognition remote controller 51. That is, when the motion recognition remote controller 51 moves forward/backward, the size of an image displayed on the network TV 30 can be increased or decreased.

Figure 6:
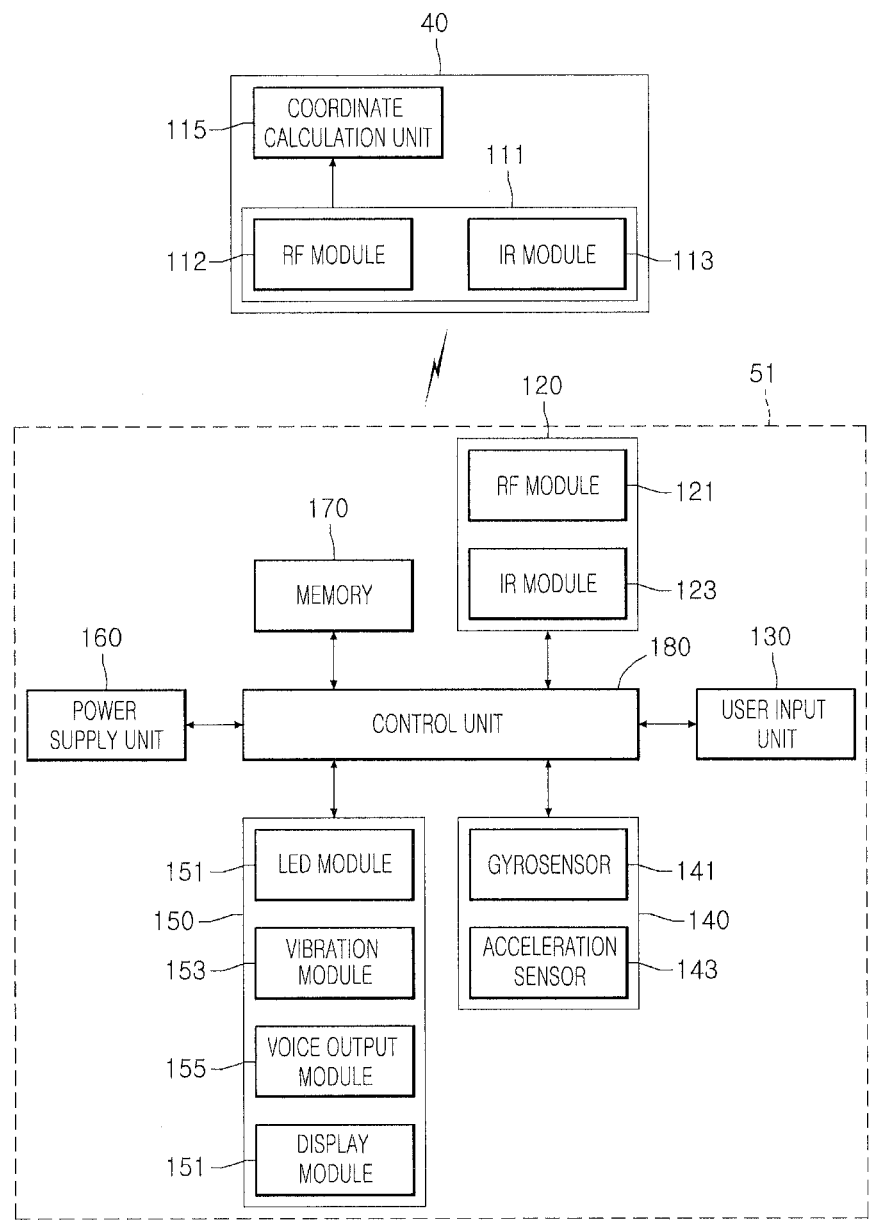
FIG. 6 is a block diagram showing an embodiment of the configuration of a motion recognition remote controller.

FIG. 6 is a block diagram showing an embodiment of the configuration of a motion recognition remote controller, that is, the configuration of the motion recognition remote controller 51 that transmits/receives signals to/from the interface unit 47 of the network TV 30 shown in FIG. 1.

Referring to FIG. 6, the network TV 30 may include a coordinate calculation unit 115 and a wireless communication unit 111. The coordinate calculation unit 115 may be included in the control unit 50 described above. The wireless communication unit 111 may be included in the user interface unit 47 described above. The wireless communication unit 111 may include an RF module 112 or an IR module 113.

Meanwhile, the motion recognition remote controller 51 may include a wireless communication unit 120, a user input unit 130, a sensor unit 140, an output unit 150, a power supply unit 160, a memory 170, and a control unit 180.

The wireless communication unit 120 transmits/receives a signal to/from the network TV 30. In this embodiment, the motion recognition remote controller 51 may have an RF module 121 that can transmit/receive a signal to/from the interface unit 40 of the network TV 30 under the RF communication regulation. Further, the motion recognition remote controller 51 may have an IR module 123 that can transmit/receive a signal to/from the interface unit 40 of the network TV 30 under the IR communication regulation.

In this embodiment, the motion recognition remote controller 51 transmits a signal carrying information about motion of the motion recognition remote controller 51 to the network TV 30, using the RF module 121. Further, the motion recognition remote controller 51 can receive a signal transmitted from the network TV 30, using the RF module 121. Further, the motion recognition remote controller 151 can transmit, if needed, an instruction about power-on/off, a channel change, a volume change etc. to the network TV 30, using the IR module 123.

The user input unit 130 may include a keypad or buttons. A user can input an instruction relating to the network TV 30, using the motion recognition remote controller 51, by operating the user input unit 130. When the user input unit 130 has a hard key button, a user can input an instruction relating to the network TV 30, using the motion recognition remote controller 51, by pressing the hard key button. When the user input unit 130 has a touch screen, a user can input an instruction relating to the network TV 30, using the motion recognition remote controller 51, by touching the soft key of the touch screen. Further, the user input unit 130 may have a variety of input means that a user can operate, such as a scroll key or a jog key, and this embodiment does not limit the scope of the present invention.

The sensor unit 140 may include a gyrosensor 141 or an acceleration sensor 143, as a motion sensor. The gyrosensor 141 can detect movement of the motion recognition remote controller 51. For example, the gyrosensor 141 can senses information on movement of the motion recognition remote controller 51, about x-, y-, and z-axes. The acceleration sensor 141 can sense information on movement velocity etc. of the motion recognition remote controller 51. The output unit 150 can output an image or voice signal corresponding to operation of the user input unit 130 or a signal transmitted from the network TV 30. A user can recognize whether the user input unit 130 is operated or the network TV 30 is controlled, from the output unit 150.

For example, the output unit 150 may have an LED module 151 that is turned on/off, a vibration module 153 that vibrates, a voice output module 155 that outputs voice, or a display module 157 that outputs video, when the user input unit 130 is operated or the network TV 30 transmits/receives a signal to/from the wireless communication unit 120.

The power supply unit 160 supplies power to the motion recognition remote controller 51. The power supply unit 160 can reduce the waste of power by stopping supplying power, when the motion recognition remote controller 51 does not move for a predetermined period of time. The power supply unit 160 can start again to supply power, when a predetermined key of the motion recognition remote controller 51 is operated.

The memory 170 can store various types of application data for operating or controlling the motion recognition remote controller 51. If the motion recognition remote controller 51 transmits/receives a signal by wireless to/from the network TV 30, using the RF module 121, the motion recognition remote controller 51 and the network TV 30 transmit/receive a signal in a predetermined frequency band.

The control unit 180 of the motion recognition remote controller 51 can store information on the frequency band, where it can wireless communication of a signal with the network TV 30 paired with the motion recognition remote controller 51, in the memory 170, and refers to it.

The control unit 180 controls the overall matters relating to controlling the motion recognition remote controller 51. The control unit 180 can transmit a signal corresponding to the operation of a predetermined key of the user input unit 130 or a signal corresponding to the operation of the motion recognition remote controller 51 sensed by the sensor unit 140, to the wireless communication unit 111 of the network TV 30, using the wireless communication unit 120.

As described above, the network TV 30 can have the wireless communication unit 120 that can transmit/receive a signal by wireless communication to/from the motion recognition remote controller 51 and the coordinate calculation unit 115 that can calculate coordinates of the pointer, which correspond to motion of the motion recognition remote controller 51.

The wireless communication unit 111 can transmit/receive a signal by wireless communication to/from the motion recognition remote controller 51, using the RF module 112. Further, it can receive a signal transmitted from the motion recognition remote controller 51, using the RF module 112, under the IR regulation.

The coordinate calculation unit 115 can calculates coordinates (x,y) of the pointer 53 that will be displayed on the display 49 by correcting hand tremble or an error, on the basis of a signal corresponding to motion of the motion recognition remote controller 51 which has been received through the wireless communication unit 111.

Further, the signal transmitted from the motion recognition remote controller 51 to the network TV 30 through the interface unit 40 is transmitted to the control unit 47 of the network TV 30. The control unit 47 recognizes information on key operation and motion of the motion recognition remote controller 51 on the basis of the signal transmitted from the motion recognition remote controller 51 and can control the network TV 30 on the basis of the recognized result.

The 'menu screen' of the network TV according to an embodiment of the present invention is an initial image or a main image when the network TV 30 enters an operation mode (hereafter, referred to as Netcast mode) that provides a menu allowing the network TV to select and connect with one of a plurality of contents providers.

The menu screen may include a plurality of icons 212 representing a plurality of contents providers, and may also include a background image 201 having a specific subject, depending on embodiments.

Figure 7:
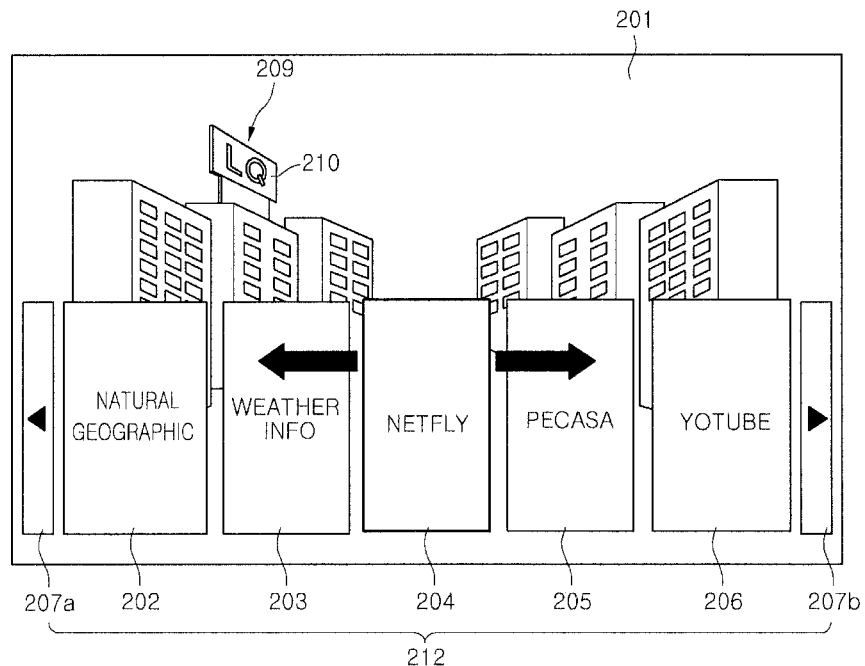
FIG. 7 is a diagram showing a first embodiment of the configuration of a menu screen of a display apparatus.

FIG. 7 shows a first embodiment of the configuration of the menu screen of a display apparatus, that is, the menu screen of the network TV 30.

Referring to FIG. 7, an image of city may be shown as the background image 201 of the menu screen, and icons 212 representing contents providers may be shown over the main screen.

The image of the menu screen can have a specific subject, other than the city shown in FIG. 7, and may have various subjects, such as a jungle, a department store, a beach, the universe, and a scene of fairy tales. The background image can include graphic objects that can be displayed by selectively inserting a basic image and other images corresponding to the subject.

The icons 212 are buttons for connecting with a plurality of contents providers and a user can be provided with desired services by selecting one of the icons 212 to connect with the selected contents provider. Preferably, the icons 212 may relate to the background image 201. That is, the icons 212 may be graphic objects corresponding to the subjects of the background image 212.

For example, as shown in FIG. 7, the icons 212 can be displayed in the shape of a structure or a signboard on the road of a city. The images displayed on the icons 212 can be provided by the contents providers, respectively.

When the background image 201 is changed in accordance with user's information, for example, the area, the icons 212 or the images displayed on the icons 212 can be changed. A user can use the motion recognition remote controller 51 with reference to FIGS. 4 to 6 in order to select the icons 212.

As an embodiment of contents providers, there are displayed icons of contents providers of Natural Geographic 202, Weather Information 203, Netfly 204, Pecasa 205, and Yotube 206 in FIG. 7.

The Natural Geographic 202 may be a contents provider that provides contents about the natural science, the Weather Information 203 may be a contents provider that provides weather information, the Netfly 204 may be a contents provider that provides contents about movies, the Pecasa 205 may be a contents provider that provides contents about photographs, and the Yotube 206 may be a contents provider that provides contents about VOD (Video on Demand).

Meanwhile, various types and numbers of icons can be additionally displayed on the menu screen, other than the above icons. Scroll bars 207a and 207b are disposed at the left and right sides of the icons 212, such that additional icons can be displayed when a user selects the scroll bars 207a and 207b.

Depending on embodiments, an image display region where other image can be displayed is defined at a portion of the background image 201, such that it is possible to display other images showing an advertisement image or message in the image display region, if needed. The advertisement image may include an advertisement and other image may include predetermined information of guide messages. The advertisement image or the other images can be provided by the network operator 10 or the contents providers 20.

According to an embodiment of the present invention, the image display region can be disposed at a predetermined position in the background image 201, and may be disposed at an appropriate position in consideration of the subject of the background image 201. For example, as shown in FIG. 7, the image display region 209 may be disposed at the outdoor signboard position and an advertisement image 211 can be displayed.

The image display region can have various shapes in accordance with the subject of the background image 201. When the subject of the background image 201 is a park, the image display region can be disposed at a pond or a tree that can easily seen in the park, or when the subject of the background image 201 is a department store, the image display region can be disposed at a show window that can be easily seen in the department store.

As described above, it is possible to display a message or an advertisement without boring a user, by displaying an image in the image display region 209 to be harmonized with the background image 201.

When a user selects one of the icons 212, for example, the Netfly icon 204, the selected icon 204 can be highlighted to be discriminated from the other icons. With the selected icon 204 highlighted, when an arrow button of the motion recognition remote controller is operated or another icon is selected, the highlight can be moved to the new selected icon.

With the icon selected, when the ENTER button of the motion recognition remote controller or a button having the function corresponding to it is pressed, it connects with the server of the contents provider corresponding to the selected icon and the initial screen of the server of the contents provider can be displayed.

Meanwhile, the number, size, position, and arrangement of icons displayed on one screen depend on embodiments. The icons 212 can include a name or an image for discriminating the contents providers, and the network TV 30 that is sold by the network TV 30 manufacturer can be sold with the icons built-in. Further, depending on embodiment, while a user purchases and uses the network TV 30, the network operator 10 of FIG. 1 may be provided with images used for the icons from the contents providers, and then transmit them to the network TV 30 or update them.

Further, the network TV 30 may directly connect with the servers of the contents providers 20 and download the images.

Figure 8:
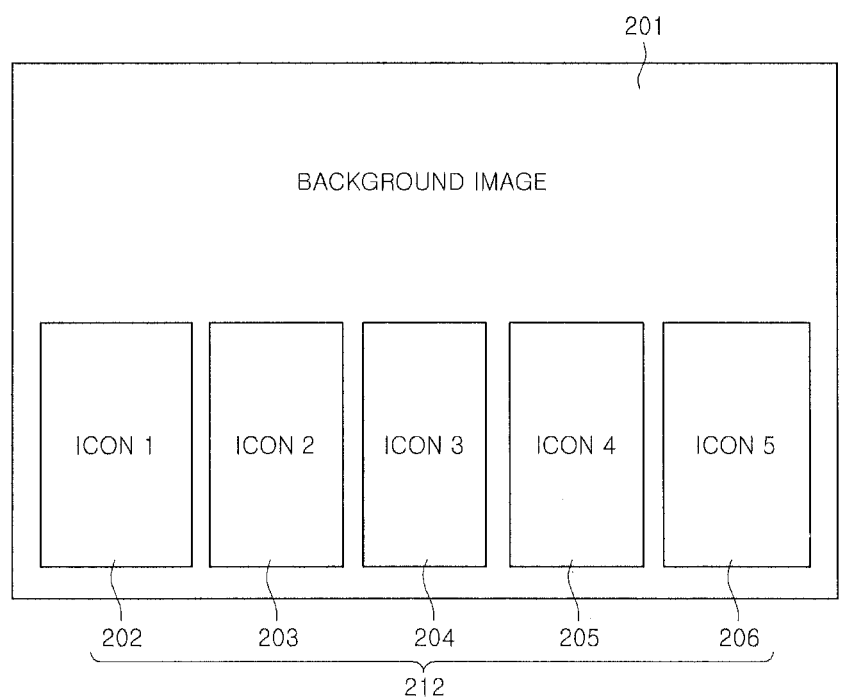
FIG. 8 is a diagram showing a second embodiment of the configuration of a menu screen of a display apparatus.

FIG. 8 shows an embodiment of a method of implementing a menu screen composed of the background image 201 and the icons 212 shown in FIG. 7.

Referring to FIG. 8, the menu screen may be composed of the background image 201 and the icons disposed thereon. The menu screen may be implemented by overlapping a layer including the background image 201 and a layer including the icons 212.

Depending on embodiments, it is possible to give the two layer different effects. For example, only the icons 212 may be translucently displayed or only the background image 201 may be translucently displayed.

Figure 9:
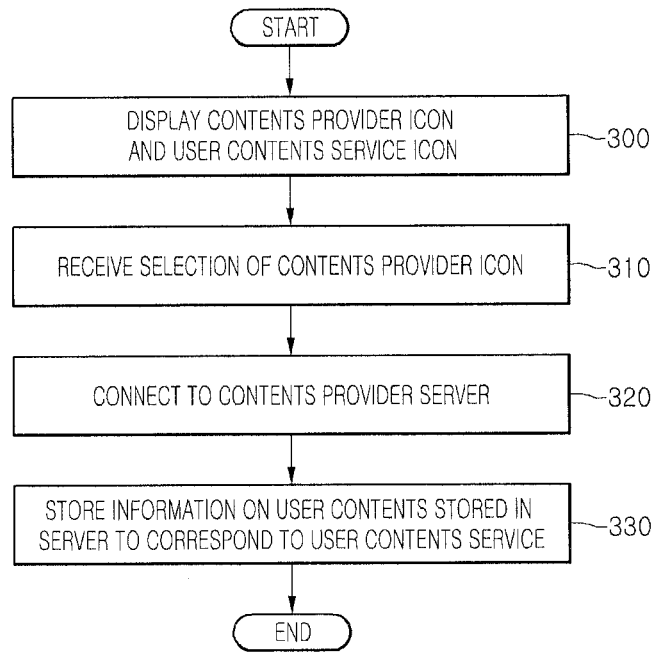
FIG. 9 is a flowchart illustrating a first embodiment of a method for managing contents according to the present invention.

FIG. 9 is a flowchart illustrating a first embodiment of a method for managing contents according to the present invention, in which the method for managing contents is described in connection with the display system shown in FIG. 1.

Referring to FIG. 9, the network TV 30 displays icons representing contents providers and icons representing user contents services, on the screen (step 300).

That is, the network TV 30 can display a plurality of icons, which a user can select, on the menu screen, and the icons may includes content provider icons corresponding to a plurality of contents providers, and user contents service icons.

The user contents service is service that makes it possible to manage and play only the user's contents in the contents provided from the contents providers, in detail, the contents provider servers 20.

For example, the user's contents may imply contents relating to the user in the contents provided from the contents providers, in more detail, may be contents uploaded or downloaded by the user or contents that the user has purchased.

Figure 10:
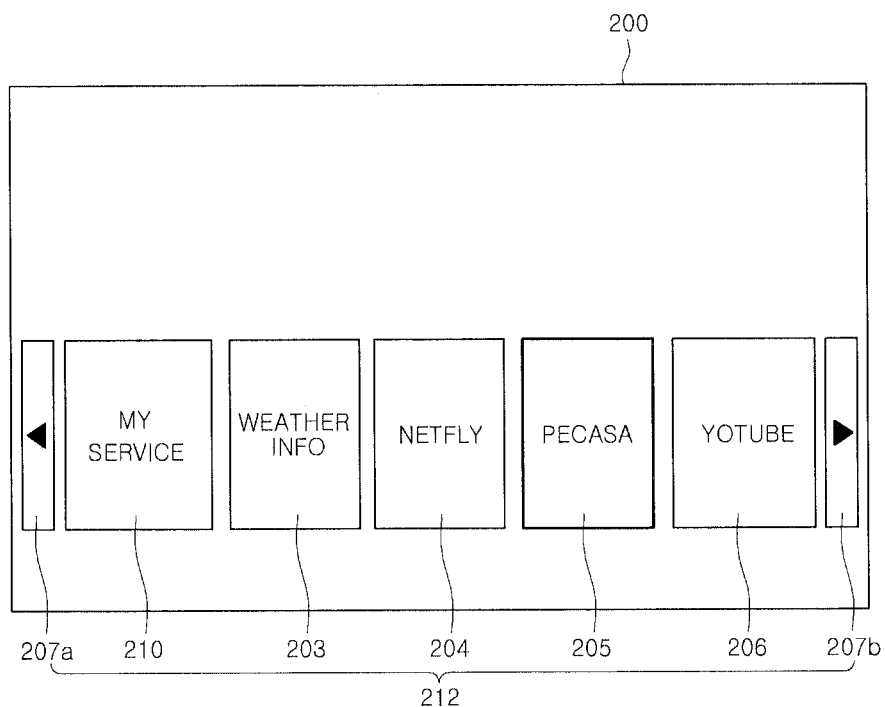
FIG. 10 is a diagram showing a third embodiment of the configuration of a menu screen of a display apparatus.

Referring to FIG. 10, the network TV 30 can display a plurality of contents provider icons 203, 204, 205, 206 and a 'MY SERVICE' icon 210 representing the user contents service, on the screen 200.

The user can select any one of the icons 210 displayed on the screen 200, and for example, can be provided with contents from a corresponding contents provider by selecting any one of the contents provider icons 203, 204, 205, 206.

For example, when the user select the 'PECASA' icon 205, the network TV 30 can connect to the contents provider server corresponding to the 'PECASA' and receive contents from the connected server.

Figure 11:
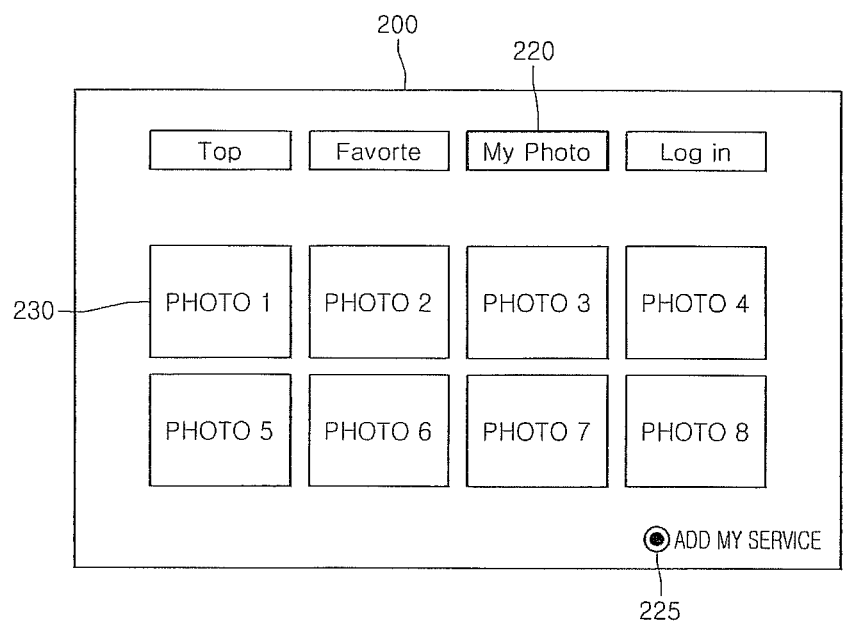
FIG. 11 is a diagram showing an embodiment of a method of displaying contents received from a contents provider server.

In this case, as shown in FIG. 11, the network TV 30 can display the contents received from the 'PECASA' server on the screen 200.

On the other hand, when the user selects the 'MY SERVICE' icon 210, the network TV 30 can display a user contents service image such that the user's contents can be managed and played.

A method of managing contents which is performed when the user selects the user contents service is described hereafter in detail with reference to FIGS. 12 to 15.

The network TV 30 receives a selection of an icon corresponding to a specific contents provider from the displayed icons (step 310) and connects to the server of the contents provider corresponding to the selected icon (step 320).

For example, the user can select an icon relating to the contents to register in the user contents service, in the contents provider icons displayed on the menu screen.

Referring to FIG. 10, the user can select the 'PESACA' icon 205 for providing photo-related contents from the contents provider icons 203, 204, 205, 206 displayed on the screen 200.

In this case, the network TV 30 can connect the 'PESACA' server corresponding to the selected icon 205 and receive contents stored in the server, and can display the 'PESACA' service screen, as shown in FIG. 11, using the received contents.

Referring to FIG. 11, the user can select the 'My Photo' item 220 to display photos that the user uploaded, on the screen 200, and accordingly, the photos (photos 1 to 8) uploaded by the user can be displayed on the screen 200.

On the other hand, when any one of the photos displayed on the screen 200, for example, the photo 1 230 is selected, the selected photo 1 230 can be enlarged and displayed on the screen 200.

According to an embodiment of the present invention, the user can register his/her contents stored in the contents provider server, for example, in 'MY SERVICE'.

Referring to FIG. 11, the user can register the contents, which are stored in the 'My Photo' item 220, for example, the photos that the user uploaded, in the 'PECASA' server, in 'MY SERVICE' by selecting the 'Add My service' button 225 displayed on the screen 200.

The network TV 30 stores information on the user's contents in the contents stored in the contents provider server, after matching them with the user contents service (step 330).

That is, when the user request for registering the user contents service, as described above, the network TV 30 can receive and store information on the user's contents stored in the server, from the server. Accordingly, when the user selects the user contents service, the network TV 30 can receive the user's contents from the server, using the stored contents information.

On the other hand, the network TV 30 may store the user contents information in the storage 49 shown in FIGS. 2 and 3, after matching it with the user contents service.

For example, the stored contents information may include positional information of the contents provider server and the user's contents, and in more detail, may include URL (Uniform Resource Locator) information for receiving the user's contents.

Referring to FIG. 11, when the user selects the 'Add My service' button 225, URLs corresponding to the photos (photos 1 to 8) uploaded by the user and stored in the 'PECASA' server can be registered in 'MY SERVICE'.

Further, the network TV 30 can store login information of the user for access the server of the contents provider, for example, the user's ID (IDentification) and a password, in the storage 49, together with the URL where the contents are stored.

According to an embodiment of the present invention, the network TV can register the user contents provided from the above or another contents provider in the user contents service, by performing the method described with reference to FIGS. 9 to 11, for another contents provider.

For example, referring to FIG. 10, the user can select the 'NETFLY' icon 204 for providing movie-related contents from the contents provider icons 203, 204, 205, 204 displayed on the screen 200.

In this case, the network TV 30 displays contents received from the 'NETFLY' server and the user can register his/her contents stored in the 'NETFLY' server, that is, moves that the user uploaded or purchased and downloaded, in the user contents service, for example, 'MY SERVICE'.

In response to the request for registration, the network TV 30 can store information on the user's contents stored in the 'NETFLY' server, that is, the user's ID and password, and the URL where the user's contents are stored, after matching them with the user contents service.

Meanwhile, the contents providers, for example, 'PECASA' and 'NETFLY' may correspond to different items in the user contents service.

That is, in the user contents service, the user contents provided from the contents provider 1 and the user contents provided from the contents provider 2 can make different user contents items.

In more detail, as described above, the user contents stored in the 'PECASA' server registered in the user contents service can be provided as the 'My Photo' item in the user contents service, and the user contents stored in the 'NETFLY' server can be provided as the 'My Movie' item in the user contents service.

Figure 12:
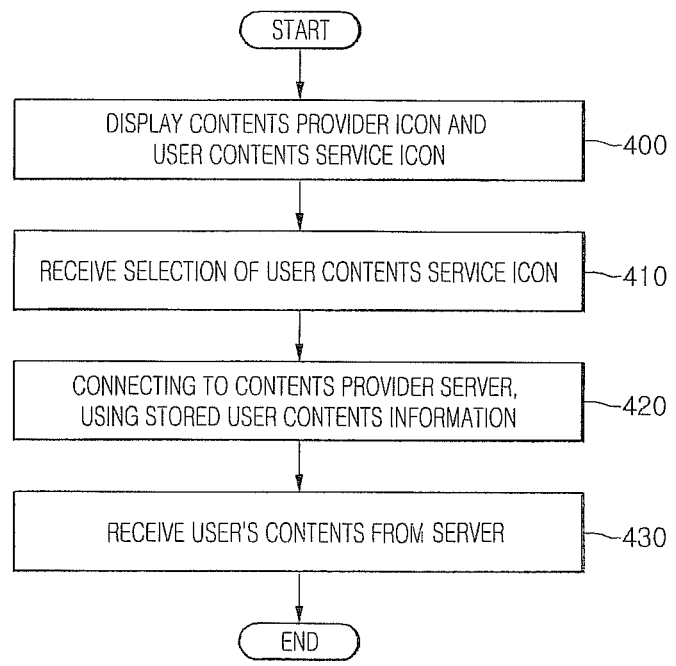
FIG. 12 is a flowchart illustrating a second embodiment of a method for managing contents according to the present invention.

FIG. 12 is a flowchart of a second embodiment of a method for managing contents according to the present invention and the same ones as those described in connection with FIGS. 9 and 11 are not described below.

Referring to FIG. 12, the network TV 30 displays icons representing contents providers and icons representing user contents services, on the screen (step 400), and receives a selection of the user contents service icon from the user (step 410).

Figure 13:
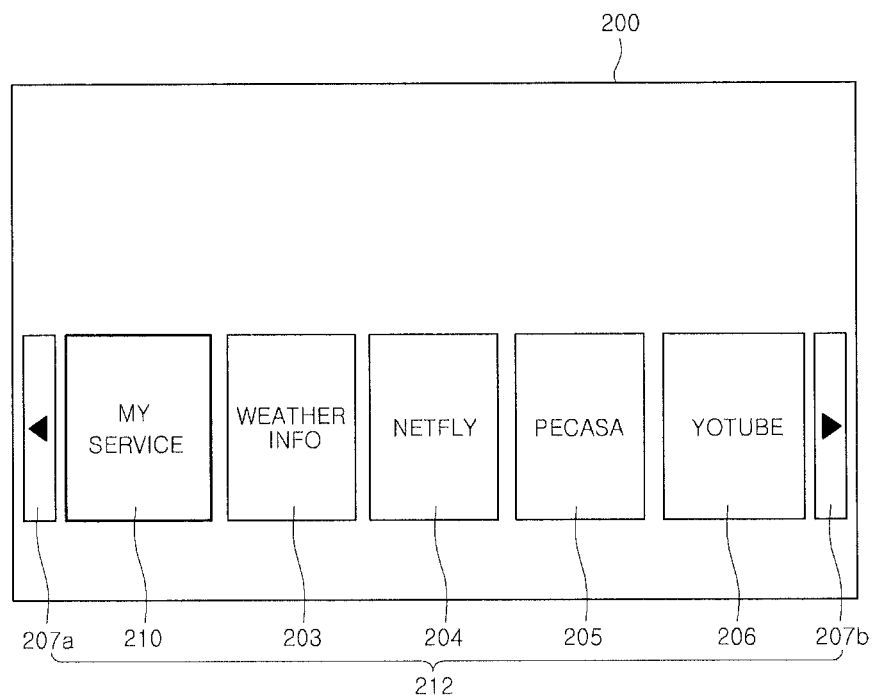
FIG. 13 is a diagram showing a fourth embodiment of the configuration of a menu screen of a display apparatus.

Referring to FIG. 13, the user can select an icon representing the user contents service from a plurality of icons displayed on the screen 200, that is, the 'MY SERVICE' icon 210.

Figure 14:
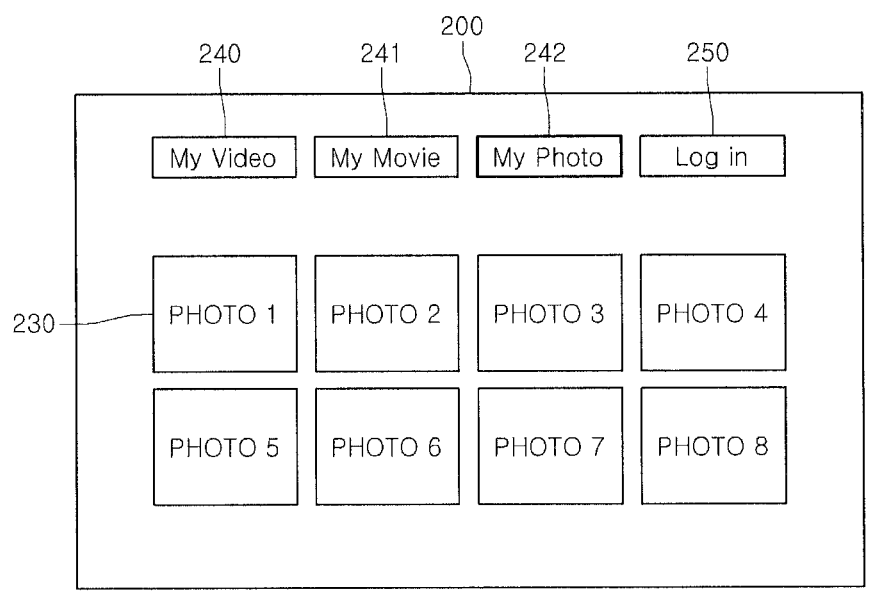
FIGS. 14 to 17 are diagrams showing embodiments of a method of providing user contents service.

In this case, the network TV 30 can display the user contents service on the screen, as shown in FIG. 14.

When the user contents service is selected, as described above, the network TV 30 connects to the contents provider server, using the stored user contents information (step 420), and receives the user's contents from the connected server (step 430).

For example, the user can select any one of the user contents service items displayed on the screen and the network TV 30 can connect to the server of the contents provider corresponding to the selected item.

Referring to FIG. 14, when the user selects the 'MY SERVICE' icon 210, user contents service including the items 240 to 242 are displayed on the screen 200.

As described above, the user contents service items 240 to 242 displayed on the screen 200 can correspond to the contents providers, respectively.

For example, the 'My Video' item 240 may be the video contents of the user, in more detail, an item for managing and playing video uploaded by the user in the server of the 'YOTUBE' contents provider shown in FIG. 13.

The 'My Movie' item 241 may be the movie contents of the user, in more detail, an item for managing and playing movies uploaded by the user in the server of the 'NETFLY' contents provider shown in FIG. 13.

Meanwhile, the 'My photo' item 242 may be the photo contents of the user, in more detail, an item for managing and playing photos uploaded by the user in the server of the PECASA' contents provider shown in FIG. 13.

When the user selects the 'My Photo' item 242, the network TV 30 can read out the user contents information stored to correspond to the user contents service, in more detail, URLs of the user contents in the PECASA sever stored to correspond to the 'My Photo' item 242.

Thereafter, the network TV 30 can connect to the 'PECASA' server, using the read URLs, and can receive the contents uploaded by the user, that is, the photos from the connected 'PECASA' server, and display them on the screen 200.

Further, when the user selects the 'My Video' item 240, the network TV 30 can connect to the 'YOTUBE' server, using the stored URL corresponding to the 'My Video' item 240, receive the video uploaded by the user, and display the received video on the screen 200.

According to an embodiment of the present invention, it is possible to provide the information on the contents uploaded or downloaded by the user, in an URL format that can be directly accessed.

Figure 15:
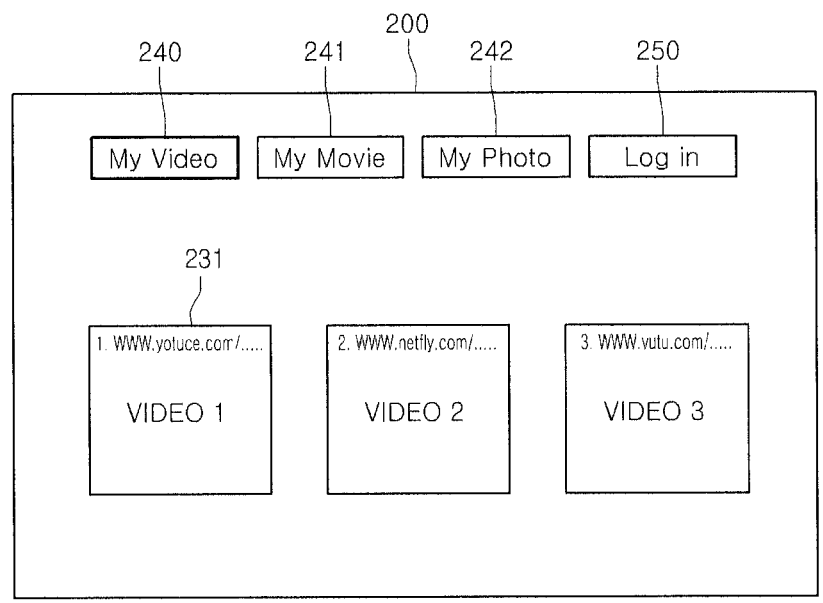

Referring to FIG. 15, when the user selects the 'My Video' item 240, information on videos uploaded or downloaded by the user can be displayed on the screen 200.

For example, when the user uploads video 1 in a contents provider server, that is, "YOTUBE", a thumbnail image 231 representing one scene of the video 1 can be displayed with the URL that makes it possible to receive the video 1.

Meanwhile, as shown in FIG. 15, other than the "YOTUBE", information on video 2 uploaded by the user in the server of "NETFLY" that is another contents provider, or information on video 3 downloaded by the user from the sever of "VUTU", for example, thumbnail images and URL information corresponding to the above information can be simultaneously displayed on the screen 200.

Meanwhile, when the user selects the thumbnail image 231, the network interface unit 45 of the network TV 30 can receive the video 1 by connecting to the server of the "YOTUBE" contents provider, using the displayed URL.

Further, other than the types shown in FIGS. 14 and 15, as contents information, uploaded data, time, and contents title can be simultaneously displayed.

The network TV 30 can download user's contents from the connected contents provider server through an Open API (Open Application Program Interface, and display them on the screen 200.

The Open API is an interface standardized between an application service hierarchy and transmission hierarchy of a communication network. An Open API for integrated communication service is an interface implemented by abstracting functions of various communication networks, such as a wire telephone network, a mobile phone network, a data communication network, and a broadcasting network, such that it is possible to easily develop new application service independent from the structure and technology of the communication network, by using the interface.

A method for managing contents according to an embodiment of the present invention may further include a step for user to log in the user contents service described above, for example, 'MY SERVICE'.

Figure 16:
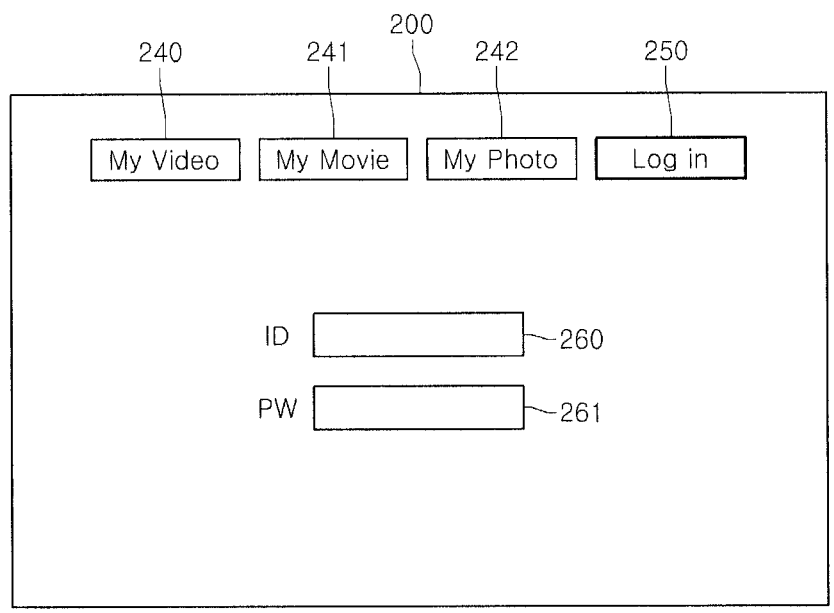

That is, when the user selects the 'Log in' item 250 displayed on the screen 200, as shown in FIG. 16, windows 260, 261 for the user to input ID and password for login to 'MY SERVICE' can be displayed on the screen 200.

The user can log in the user contents service, that is, 'MY SERVICE' by inputting his/her ID and password, using the input windows 260, 261.

When the user logs in 'MY SERVICE' and is admitted to access the user contents service, as described above, log-in for the items included in the user contents service is not needed and the log-in is automatically achieved.

That is, when the user is admitted to access the user contents service, using the method described with reference to FIG. 16, the network TV 30 can connect to the contents provider server, using login information stored in advance for the contents providers.

Referring to FIG. 14, when the user selects the 'My Photo' item 242, the network TV 30 can read out a contents URL stored to correspond to the 'My Photo' item 242 in the storage 49 and login information on the 'PECASA' contents provider.

Thereafter, the network TV 30 can receive the photos uploaded by the user, by connecting to the 'PECASA' server, using the stored login information, for example, the user's ID and password for login to the 'PECASA' server.

According to an embodiment of the present invention, the contents information uploaded or downloaded by the user can be transmitted and stored in the network operator 10 shown in FIG. 1. In this case, the user can receive the uploaded contents information by accessing the network operator 10, using another network TV or a network device. Further, it is possible to access contents uploaded by himself/herself with another device, using the received contents information.

For example, it is possible to receive the information on contents uploaded through a network TV at home, using devices at other places, for example, workplaces or friends' home. Therefore, it is possible to receive the menu screen described above, or receive information on contents that the user uploaded in different formats. As a result, the user can access at anytime anywhere the contents that the user uploaded once, regardless of the types of terminals.

Figure 17:
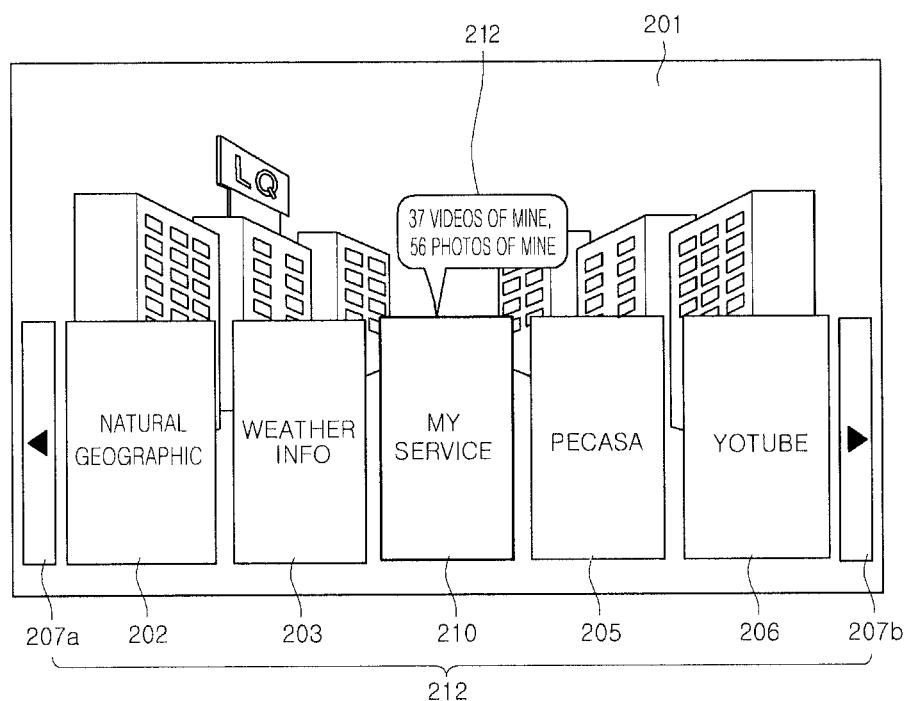

FIG. 17 illustrates a method of displaying abstract information when a user selects the user contents icon, according to an embodiment of the present invention.

Referring to FIG. 17, when a user selects the "MY SERVICE" icon 210 in the menu screen, abstract information on the contents that the user uploaded or downloaded can be displayed in the shape of a help balloon 231.

Meanwhile, other than the help balloon 231 shown in FIG. 17, the abstract information on the user's contents can be simply displayed on the menu screen in various ways.

According to another embodiment of the present invention, the network TV 30 can display a plurality of icons, which a user can select, on the menu screen, and the icons may includes content provider icons corresponding to a plurality of contents providers, and icons representing concerned contents lists.

Figure 18:
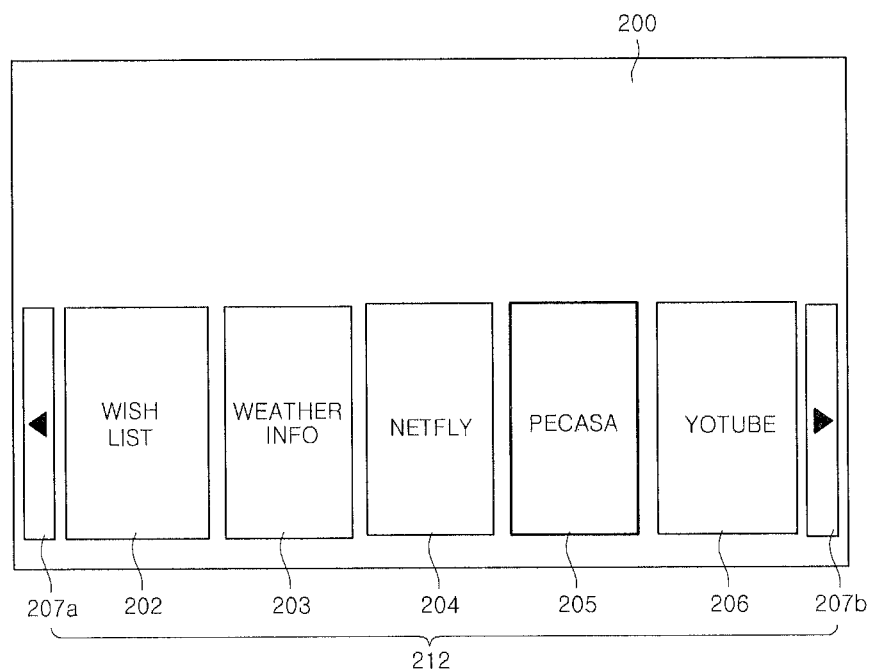
FIG. 18 is a diagram showing a fifth embodiment of the configuration of a menu screen of a display apparatus.

Referring to FIG. 18, the network TV 30 can display a plurality of contents provider icons 203, 204, 205, 206 and a 'WISH LIST' icon 215 representing concern lists, on the screen 200.

The user can select any one of the icons 210 displayed on the screen 200, and for example, can be provided with contents from a corresponding contents provider by selecting anyone of the contents provider icons 203, 204, 205, 206.

For example, when the user select the 'PECASA' icon 205, the network TV 30 can connect to the contents provider server corresponding to the 'PECASA' and receive information on purchasable contents from the connected server.

Figure 19:
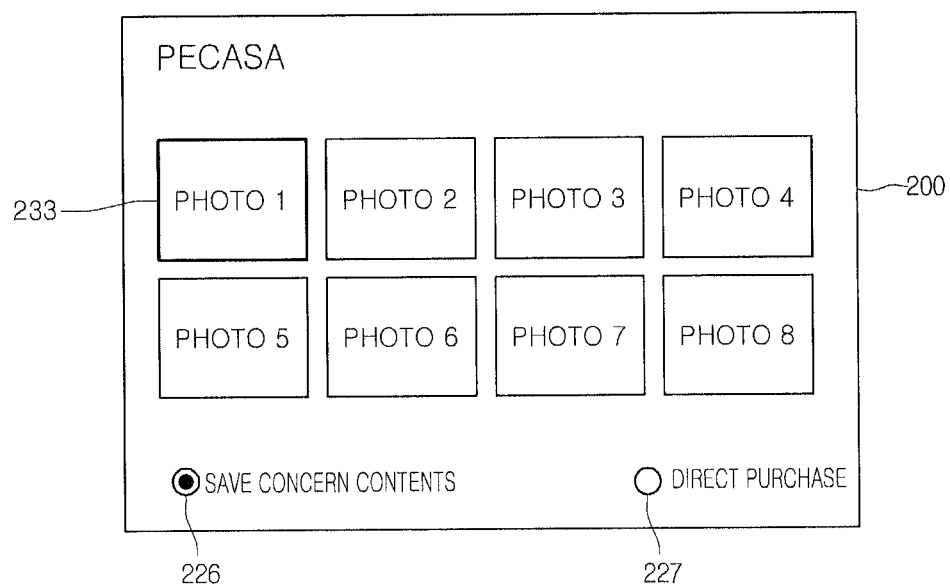
FIGS. 19 and 20 are diagrams showing embodiments of a method of displaying contents purchasable from contents providers.

In this case, as shown in FIG. 19, purchasable contents from the 'PECASA' contents provider can be displayed on the screen 200.

On the other hand, when the user selects the 'WISH LIST' icon 215, the network TV 30 can display a concern contents list for user to manage and purchase contents stored as concern contents, on the screen.

According to an embodiment of the present invention, the concern contents list may include two or more contents provided from different contents providers.

That is, the user can store a plurality of contents that can be purchased from two or more contents providers in a plurality of connectable contents providers in the concern contents list, and accordingly, it is possible to manage and purchase a plurality of contents by using one concern contents list, regardless of the contents providers.

Thereafter, the network TV 30 can receive a selection of any one of the displayed contents and store information on the selected contents in the concern contents list.

For example, the user can select a contents provider icon relating to contents to purchase, in the contents provider icons displayed on the menu screen.

Referring to FIG. 18, the user can select the 'PESACA' icon 205 for providing photo-related contents from the contents provider icons 203, 204, 205, 206 display on the screen 200.

In this case, the network TV 30 can connect the 'PESACA' server corresponding to the selected icon 205 and receive information purchasable and can display the 'PESACA' service screen, as shown in FIG. 19, using the received contents information.

Referring to FIG. 19, the user can select at least on content from the contents displayed on the screen 200, that is, from the photos, and can store the selected content in the concern contents list.

For example, the user can select an image 233 corresponding to 'Photo 1' and then stored the 'Photo 1' in the concern contents list by pressing a concern contents save button 226, and accordingly, information on the 'Photo 1' can be stored in the concern contents list.

In more detail, the name, provider, abstract, and location information of the selected contents can be stored in the concern contents list as the contents information. Meanwhile, the location information may be URL (Uniform Resource Locator) for receiving the selected contents.

Meanwhile, the user can directly purchase the 'Photo 1' without storing the 'Photo 1' in the concern contents list by pressing a direct purchase button 227 after selecting the 'Photo 1', and accordingly, the 'Photo 1' can be transmitted to the network TV 30 from the 'PECASA' server, for purchase.

Further, the user can select the 'NETFLY' icon 204 for providing movie-related contents from the contents provider icons 203, 204, 205, 204 displayed on the screen 200.

Figure 20:
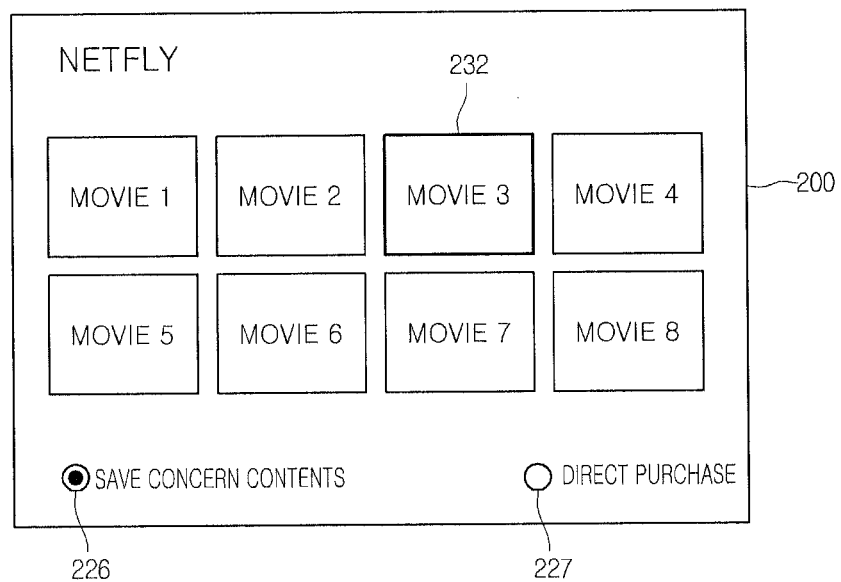

In this case, the network TV 30 can connect the 'NETFLY' server corresponding to the selected icon 205 and receive information purchasable and can display the 'NETFLY' service screen, as shown in FIG. 20, using the received contents information.

Referring to FIG. 20, the user can select at least on content from the contents displayed on the screen 200, that is, from the movies, and can store the selected content in the concern contents list.

For example, the user can select an image 232 corresponding to 'Movie 3' and then stored the 'Movie 3' in the concern contents list by pressing a concern contents save button 226, and accordingly, information on the 'Movie 3' can be stored in the concern contents list.

Since the concern contents described with reference to FIGS. 19 and 20 are stored, a plurality of contents that can be purchased from different contents providers can be stored in one concern contents list.

For example, the 'Photo 1' purchasable from the 'PECASA' contents provider and the 'Movie 3' purchasable from the 'NETFLY' contents provider can be stored in the concern contents list.

On the other hand, the network TV 30 may store the concern contents list described above, that is, information on contents stored as concern contents by the user, in the storage 49 shown in FIGS. 2 and 3.

Figure 21:
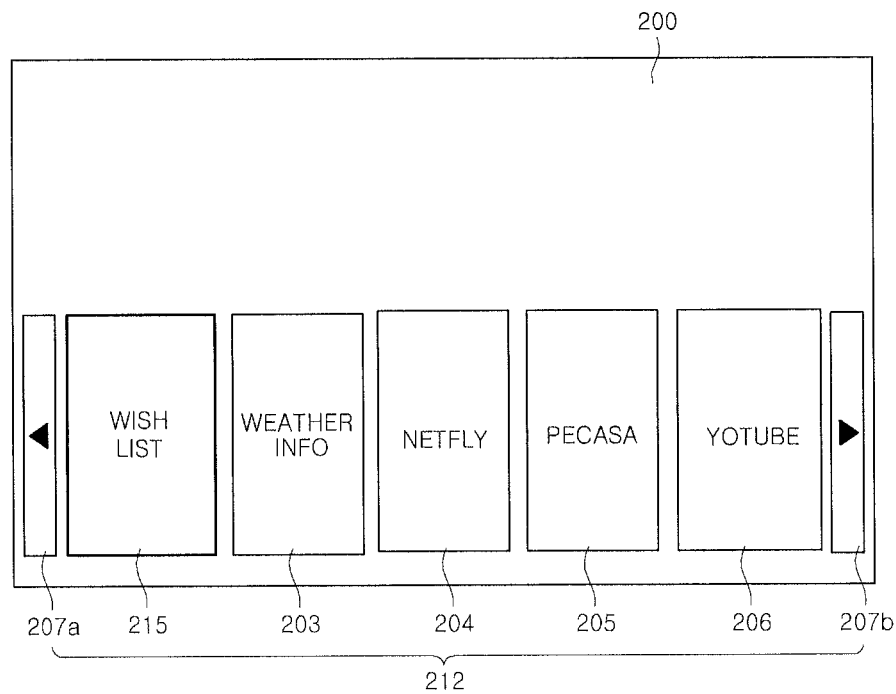
FIG. 21 is a diagram showing a sixth embodiment of the configuration of a menu screen of a display apparatus.

Referring to FIG. 21, the user can select an icon representing the concern contents list from a plurality of icons 212 displayed on the screen 200, that is, the 'WISH LIST' icon 215.

Meanwhile, the 'MY SERVICE' icon 210 representing the user contents service described above with reference to FIGS. 9 to 17 can be displayed with the 'WISH LIST' icon 210.

Figure 22:
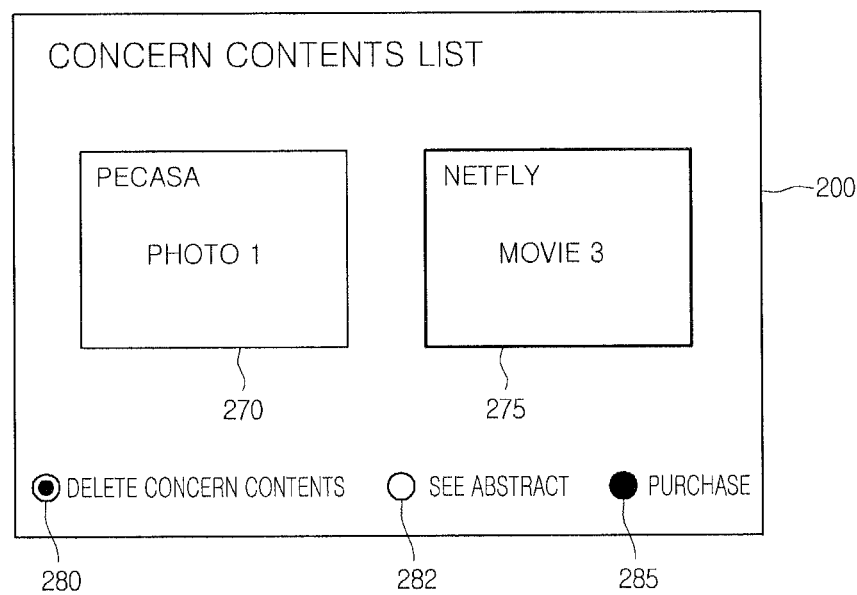
FIGS. 22 to 24 are diagrams showing embodiments of a method of purchasing contents, using a concerned contents list.

In this case, the network TV 30 can display a screen including the concern contents list shown in FIG. 22.

When the 'WISH LIST' icon 215 is selected, as described above, the network TV 30 can display one or more contents that are stored as concern contents by the user, using contents information stored in the concern contents list.

Meanwhile, as shown in FIG. 22, the concern contents list displayed on the screen 200 can include a plurality of contents and at least two of the contents may be those provided from different contents providers.

That is, a concern contents list according to an embodiment of the present invention is not limited to any one of a plurality of contents providers, and various contents provided from a plurality of contents providers may be integrally managed and purchased.

Referring to FIG. 22, when the user selects the 'WISH LIST' icon 215, a plurality of concern contents 270, 275 may be displayed on the screen 200.

That is, when the user stores the 'Photo 1' provided from the 'PECASA' contents provider and the 'Movie 3' provided from the 'NETFLY' contents provider, as concern contents, as shown in FIG. 22, different contents providers, that is, information on the 'Photo 1' and 'Movie 3' provided from the 'PECASA' and the 'NETFLY', respectively, can be included in the concern contents list displayed on the screen 200.

Meanwhile, information on the contents shown in the concern contents list may include information on the name, provider, and price of the corresponding contents.

The user can purchase corresponding contents, by selecting and then purchasing (285) at least one of the contents 270, 275 from the concern contents list.

For example, the user can confirm the purchase of the 'Movie 3' by pressing the purchase button 285, after selecting the 'Movie 3' provided from the 'NETFLY' contents provider. In this case, the network TV 30 can connect to the 'NETFLY' server, using the location information of the 'Movie 3', which is the selected content, for example, the URL where the 'Movie 3' is stored, and then receive the 'Movie 3' contents, that the user wants to purchase, from the connected 'NETFLY' server.

Meanwhile, the user can check specifications, such as synopsis, of the contents in the concern contents list by selecting 'see abstract' 282, before purchasing.

For example, abstract information on the contents 270, 275 included in the concern contents list can be stored in the concern contents list, and the user can display abstract information about corresponding contents on the screen 200, using the stored abstract information, when selecting the 'see abstract' button 282 after selecting specific contents.

Further, the user can delete corresponding contents from the concern contents list, when selecting a 'delete contents' 282, after selecting specific contents.

The method of displaying a concern contents list illustrated in FIG. 22 is just an embodiment of the present invention and does not limit the present invention, and the contents list may be displayed in various ways, other than the method illustrated in FIG. 22.

Figure 23:
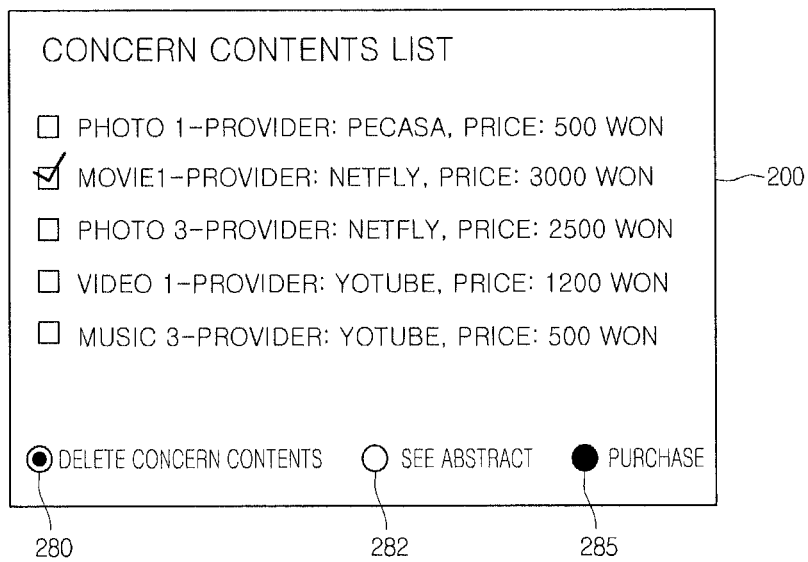

Referring to FIG. 23, the concern contents list displayed on the screen 200 may include a plurality of contents provided from two or more contents providers.

That is, the concern contents list may include the 'Photo 1' provided from the 'PECASA', 'Movie 1' and 'Photo 3' provided from the 'NETFLY', and 'Video 1' and 'Music 3' provided from 'YOTUBE'.

Meanwhile, as described above, the names, providers, and prices of the contents can be shown in the concern contents list.

Figure 24:
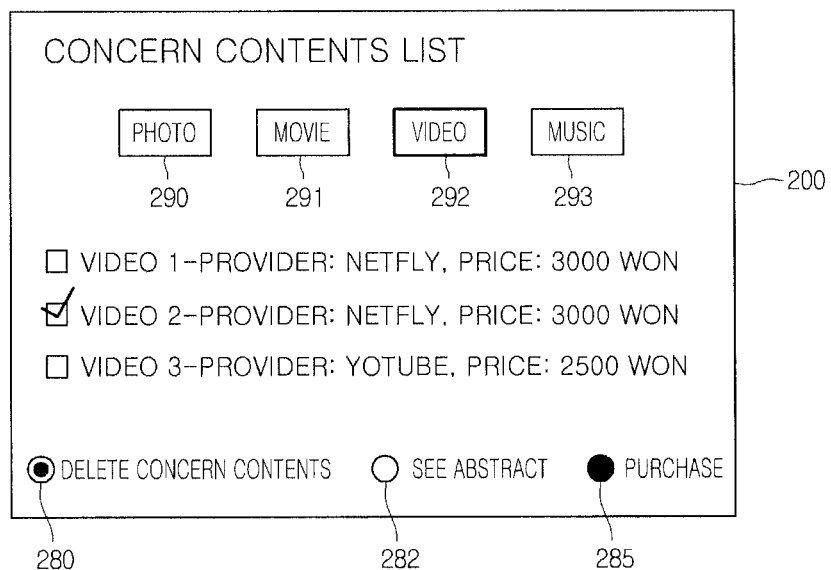

Referring to FIG. 24, the concern contents list can include contents items 290, 291, 292, 293 corresponding to a plurality of contents categories, and the contents categories may include at least one of video, movie, photo, and music.

Meanwhile, the contents items 290, 291, 292, 293 may include contents pertaining to corresponding categories, and the contents pertaining to anyone item may be contents provided from different contents providers.

For example, when the user selects video 292 from the contents items 290, 291, 292, 293 shown in the concern contents list, video contents stored as concern contents by the user can be displayed on the screen 200.

Further, the contents included in the video 292 item, the video 1 to video 3 may be contents provided from different contents providers.

That is, the 'Video 1' and 'Video 2' provided from the 'NETFLY' and the 'Video 3' provided from the 'YOTUBE' may be included in the video 292 in the concern contents list.

The user can select any one of the displayed video 1 to video 3, for example, select and purchase 285 the video 2, and accordingly, the network TV 30 can receive the purchased video 2 by connecting to the 'NETFLY' server.

According to an embodiment of the present invention, it is possible to easily manage and play user's contents stored in various contents providers, using display apparatuses that can be connected to a network.

Further, it is possible to improve convenience in managing and purchasing various contents, by managing a plurality of contents provided from contents providers, in one concern contents list, with display apparatuses connectable to a network.

Further, the method for managing contents according to the present invention to a video call may be programmed to be executed by a computer and stored in a computer-readable recording media, in which the computer-readable recording media may be ROM, RAM, CD-ROM, magnetic tape, floppy disc, and optical data storage, and may be implemented in a carrier wave type (e.g. transmitted by Internet).

Further, the computer-readable recording media are distributed on computer systems connected through the network, and thus the computer-readable recording media may be stored and executed as the computer-readable code by a distribution scheme. Further, functional programs, codes, and code segments for implementing a method of receiving broadcast can be easily inferred by programmers in the related art.

Although preferred embodiments of the present invention have been illustrated and described, the present invention is not limited to the above-mentioned embodiments and various modifications can be made by those skilled in the art without the scope of the appended claims of the present invention. In addition, these modified embodiments should not be appreciated separately from technical spirits or prospects.

What is claimed is:

1. A network TV device comprising:
    a module for playing and searching at least one of contents provided from a contents provider and displaying lists, wherein the module is installed in the network TV device during manufacturing or is downloadable from the contents provider;
    the network TV device equipped with a broadcast receiver that receives a broadcasting signal;
    a display of the network TV device configured to display at least one of icons which respectively represents a content provider and a user icon for providing the contents that the network TV device has accessed through the content provider server corresponding to the content provider, wherein the display has plurality of scroll bars disposed at the left and right sides of user icons, such that additional user icons are displayed when a user selects an input on the scroll bar of the network TV device;
    a network interface configured to receive the contents from the content provider server through a network, wherein the content provider server includes at least one of packet filter (PF) server, electronic content guide service provider, EPG service provider and a portal server operator; and
    a controller configured to receive a first request for selecting the displayed user icon from a remote controller, control the display to display a service screen in response to the first request, wherein the service screen includes at least one of items which respectively represents a type of content, receive a second request from the remote controller for selecting one item from among the at least one of items which represents a type of content, control the display to display information on at least one of contents corresponding to the selected item in response to the second request, wherein the at least one of contents are uploaded to the content provider server by the network TV device, and the information on the at least one of contents includes a thumbnail image corresponding to the content and an access information for accessing the content in a form of customized menu screen for a particular user other than the thumbnail on prescribed regions of the display screen on the network TV device, wherein the controller allows the user to access user specific content uploaded or downloaded to and from the content provider server on the network using the thumbnail to manage and play the user specific content, receive a third request for selecting the thumbnail image from the remote controller, and control the network interface to receive the content corresponding to the selected thumbnail image from the content provider server in response to the third request.

2. The network TV device according to claim 1, wherein the controller is further configured to display abstract information on the at least one of contents that the network TV device has accessed adjacent to the user icon.

3. The network TV device according to claim 1, wherein the controller is further configured to receive a command from the remote controller for selecting one content from among the at least one of contents, and display abstract information on the selected content according to the command.

4. The network TV device according to claim 1, wherein the controller is further configured to receive a command from the remote controller for selecting one icon from among the at least one of icons, access a content provider server corresponding to the selected icon according to the command, and register at least one of contents provided from the accessed content provider server.

5. The network TV device according to claim 1, wherein the at least one of items includes a log-in item, and the controller is further configured to receive a command from the remote controller for selecting the login item, and display a window for inputting login information.

6. A method comprising:

playing and searching, by a module of the network TV device, at least one of contents provided from a contents provider and displaying lists, wherein the module is installed in the network TV device during manufacturing or is downloadable from the contents provider;

displaying, by a display of the network TV device, at least one of icons which respectively represents a content provider and a user icon for providing the contents that the network TV device has accessed through the content provider server, wherein the display has plurality of scroll bars disposed at the left and right sides of user icons, such that additional user icons are displayed when a user selects an input on the scroll bar of the network TV device, receiving, by a network interface, the contents from the content provider server through a network, wherein the content provider server includes at least one of packet filter (PF) server, electronic content guide service provider, EPG service provider and a portal server operator;

receiving, by the network TV device, a first request from a remote controller for selecting the displayed user icon;

displaying, by the display of the network TV device, a service screen in response to the first request, wherein the service screen includes at least one of items which respectively represents a type of content;

receiving, by the network TV device, a second request from the remote controller for selecting one item from among the at least one of items which represents a type of content;

displaying, by the network TV device, information on at least one of contents corresponding to the selected item in response to the second request, wherein the at least one of contents are uploaded to the content provider server by the network TV device, and the information on the at least one of contents includes a thumbnail image corresponding to the content and an access information for accessing the content in a form of customized menu screen for a particular user other than the thumbnail on prescribed regions of the display screen on the network TV device, wherein the controller allows the user to access user specific content uploaded or downloaded to and from the content provider server on the network using the thumbnail to manage and play the user specific content;

receiving a third request for selecting the thumbnail image from the remote controller; and receiving, by the network TV device, the content corresponding to the selected thumbnail image from the content provider server in response to the third request from the remote controller.

7. The method according to claim 6, wherein the method further comprises displaying abstract information on the at least one of contents that the network TV device has accessed adjacent to the user icon.

8. The method according to claim 6, wherein the method further comprises:

receiving a command from the remote controller for selecting one content from among the at least one of contents, and displaying abstract information on the selected content according to the command.

9. The method according to claim 6, wherein the method further comprises:

receiving a command from the remote controller for selecting one icon from among the at least one of icons, accessing a content provider server corresponding to the selected icon according to the command, and registering at least one of contents provided from the accessed content provider server.

* * * * *